(No Model.)
O. GASSETT.
APPARATUS FOR DISTRIBUTING ELECTRICITY.
No. 310,664. Patented Jan. 13, 1885.
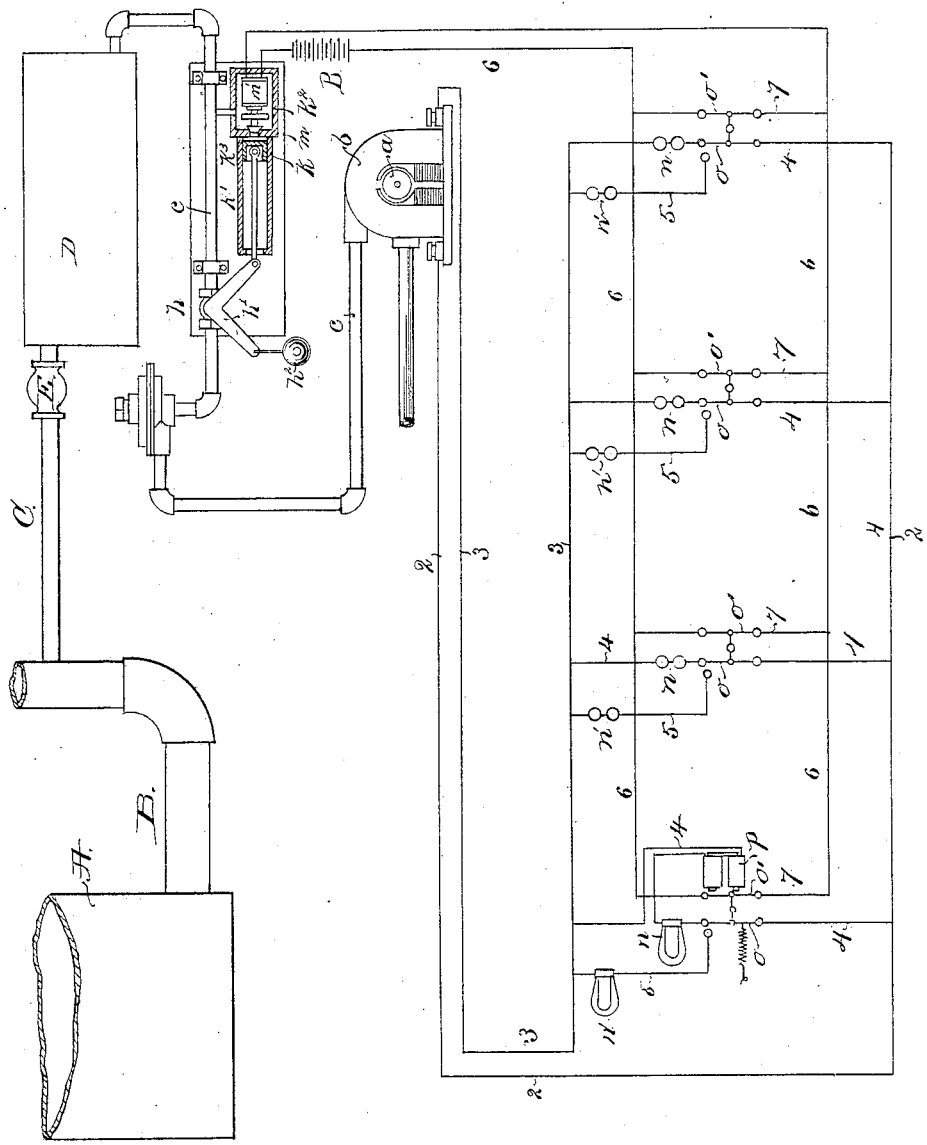

UNITED STATES PATENT OFFICE.

OSCAR GASSETT, OF BOSTON, MASSACHUSETTS.

APPARATUS FOR DISTRIBUTING ELECTRICITY.

SPECIFICATION forming part of Letters Patent No. 310,664, dated January 13, 1885.

Application filed February 23, 1884. (No model.)

*To all whom it may concern:*

Be it known that I, OSCAR GASSETT, of Boston, county of Suffolk, State of Massachusetts, have invented an Improvement in Apparatus for Distributing Electricity, of which the following description, in connection with the accompanying drawing, is a specification, like letters on the drawing representing like parts.

My invention has for its object to enable power to be economically and conveniently employed for generating electricity, and the said electricity then to be employed for any of the usual purposes for which electricity is used, either for producing light or heat or mechanical power. Usually, when electrical energy of any kind is to be distributed among various consumers, it has been common to generate the electricity at one main station and then convey it by suitable conductors to the various stations or buildings where it is to be used, and the generator of the electricity is not under the control of the consumer.

The present invention is embodied in an apparatus in which a mechanical power or motor is employed to actuate an electrical generator, the said motor being controlled by an electro-magnet the circuit of which is extended to all the points at which the electricity is to be used.

When several different instruments are to be operated by the current produced by a single generator, the said instruments will be arranged in multiple-arc circuit, and each branch circuit containing an instrument will have a corresponding substitute branch of substantially the same resistance, which will be closed when the branch containing the instrument is opened, thus maintaining the circuit of the generator substantially uniform.

The switches or keys controlling the circuit of the magnet that controls the motor are preferably operatively connected with the switches controlling the circuits of the instruments in such a manner that when the circuit of any instrument is closed the motor will be set in operation, and it will remain in operation until all the switches controlling the instruments are opened, so that no one consumer can cut off the power when others are desirous of using it.

In another application, No. 108,425, I have shown and described similar apparatus for storing and distributing power or mechanical force and converting the latter into electricity; but in the said application the electricity was shown as used for lighting purposes only, and the claims were limited to an apparatus for lighting, while in the present application the claims are not limited to any specific appliances for utilizing the electric current. In another application, No. 133,547, filed June 2, 1884, I also show apparatus for storing power by fluid under pressure, and for distributing said power and converting it into electricity, the apparatus for converting being controlled by an electric circuit; and I do not in my present application claim the combination of elements claimed in said application No. 133,547.

The drawing shows in diagram the apparatus for distributing power and electricity in accordance with this invention. The electric generator $a$, of any suitable or usual construction, is actuated by any suitable mechanical motor, $b$, which is itself actuated by the pressure of a fluid in the pipe $c$, which may be the steam-pipe from a steam-generator, or may be connected with a street-main for supplying compressed air as a motive power. The flow of fluid through the pipe $c$ to the motor $b$ is controlled by the valve $h$, the stem of which is provided with a bell-crank lever, $h'$, one arm of which is acted upon by a weight, $h^2$, tending to move it in the direction to close the valve, and the other arm of which is connected with a piston, $k$, operating in a cylinder, $k'$, connected with a chest, $k^2$, itself communicating with the pipe $c$, and containing a fluid under pressure, which, when admitted to the cylinder $k'$, will move the piston $k$ and connected lever $h'$, opening the valve $h$. The admission of fluid from the chest $k^2$ into the cylinder $k'$ is controlled by a valve, $m$, operated by the armature of an electro-magnet, $m'$, which, when energized, attracts the said armature, opens the valve $m$, and permits the fluid to pass into the cylinder $k'$, to act on the piston $k$ therein. The said piston has a loose fit in the cylinder $k'$, but when pressed forward comes to a seat upon the head $k^3$, preventing the free escape of the fluid around the piston, the pressure of which behind it keeps it pressed against its seat. The piston $k$ is not, however, absolutely tight on its seat, and when the valve $m$ is closed so as to no longer maintain a supply of fluid behind the piston, the fluid in the cylinder will escape, permitting the weight $h^2$ to dislodge the piston $k$ from its seat, when it will be moved back through the cylinder, the fluid in the cylinder escaping around the piston, which is, however, cushioned by the said fluid.

The circuit of the generator $a$ consists of wires 2 3, from either terminal thereof, having branches 4 connecting them, and including the instruments $n$, of any suitable or usual construction, for utilizing the electricity, the said instruments being either electric motors for doing mechanical work or lamps or heating devices, as may be desired. The branches 4 also include switches $o$, by which they may be opened or closed to set the instruments $n$ in operation or to cause them to cease operating.

In order to keep the resistance substantially uniform in the circuit and instruments $n$ that are in operation when one or more of the said instruments $n$ are thrown out of operation, branches 5 are employed, containing resistance $n'$, equal to that of the instruments $n$, the resistance preferably being of such nature that the current flowing through it may be utilized in some manner, it being possible to place such resistance at any desired point, so that as the instruments $n$ are open-circuited the substitute branches will be closed and the resistance $n'$ included in the circuit, the switches $o$ being arranged to close the branches 5 in the movement by which they open the branches 4.

In order that the generator may be set in operation whenever one or more of the instruments $n$ are to be used, the circuit 6 of the battery B and magnet $m'$ controlling the valve $m$, and through it the valve $h$, is provided with closing branches 7, including switches $o'$, mechanically connected with the switches $o$, so that when the latter are moved to open or close the branches 4, containing the instrument $n$, the branches 7 will also be opened and closed, and it is only when all the said branches are opened or all the instruments $n$ thrown out of operation that the said circuit 6 will be opened, causing the valves $m$ and $h$ to close, and thus stopping the motor.

If desired, the switches $o$ $o'$ may be operated automatically, as by an electro-magnet, $p$, included in that portion of the branch 4 which is left open when the branch 5, containing the substitute instrument $n'$, is closed. The switch will be provided with an armature for the said magnet $p$, which, so long as the branch 4 remains closed, will retain the switch $o$ $o'$ in position to close the branches 4 and 7; but in case of the breaking of the branch 4, as by the destruction of the instrument $n$ therein, the switch, being no longer held by its magnet, will be moved by its retracting-spring $p'$ to close the branch 5.

When the power for a number of different sub-stations or buildings is to be derived from one common or main station, the power or motor at the main station will be employed to compress air into a main reservoir, A, from which the air will be conveyed by suitable main pipes, B, leading through the streets to small branch or service pipes C, leading into each building or sub-station, which is provided with a reservoir, D, that supplies the pipe $c$, leading to the motor, as before described. The reservoir D will be of sufficient size to store power enough to drive the motor for a considerable length of time in case the supply from the main pipe B should be exhausted. The pipe C is provided with a check-valve, E, which prevents the air from escaping from the reservoir D back into the pipe B when the pressure in the said pipe is below that in the reservoir D.

By the employment of reservoirs D at each sub-station, the motor at the main station may be run practically continuously, compressing air which is stored in the various reservoirs, so that it may be used during a portion of the time at a rate greater than that which the main motor is capable of supplying if operating only while the consumption was going on.

I claim—

1. In an apparatus for distribution of electricity, a mechanical motor and electric generator actuated thereby, combined with an electro-magnet controlling the application of power to the said motor and circuit therefor, and a circuit for the said generator and instruments operated by the current therein, and switches controlling the circuit of the said instruments and the circuit of the controlling-magnet, substantially as described.

2. In an apparatus for distribution of electricity, a motor and electric generator actuated thereby, and an electro-magnet controlling the application of power to the said motor, combined with a circuit from the said generator, having branches, each containing apparatus for utilizing the electric current, and a circuit for the motor-controlling magnet, and switch controlling both the said circuits simultaneously, substantially as described.

3. In an apparatus for distribution of electricity, a motor and electric generator actuated thereby, and an electro-magnet controlling the application of power to the said motor, combined with a circuit from the said generator, having branches containing electrical instruments and substitute branches of equal resistance, and a circuit for the motor-controlling magnet, and switches controlling the branches of the generator-circuit and the circuit of the generator-controlling magnet simultaneously, substantially as described.

4. A system for distributing power and electricity comprising the following elements in combination: a main station containing a main reservoir for fluid under pressure, sub-stations, each containing a reservoir connected by pipes with the main reservoir, and a motor and electric generator actuated thereby, and an electro-magnet controlling the passage of fluid from the reservoir to the motor, and circuits for the said generator and controlling-magnet, having circuit - controlling instruments accessible in common, substantially as described.

In testimony whereof I have signed my name to this specification in the presence of two subscribing witnesses.

OSCAR GASSETT.

Witnesses:
    Jos. P. LIVERMORE,
    W. H. SIGSTON.